Figure 2:
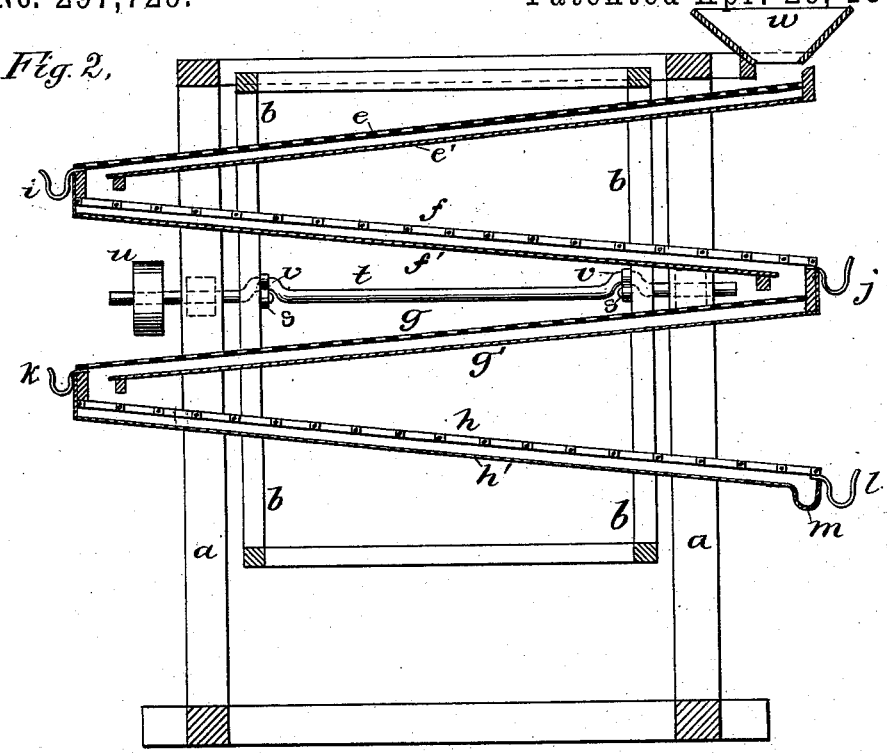

(No Model.)  2 Sheets—Sheet 1.
J. S. THOMPSON.
COFFEE SEPARATOR AND ASSORTER.
No. 297,729.  Patented Apr. 29, 1884.
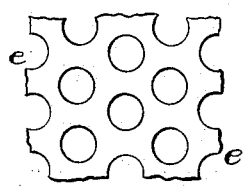
Fig. 4.
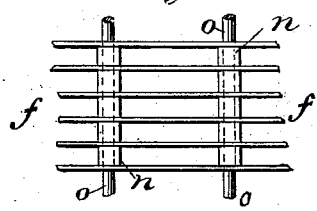
Fig. 5.
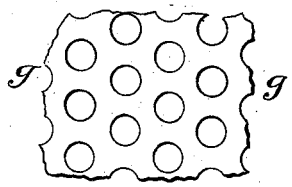
Fig. 6.
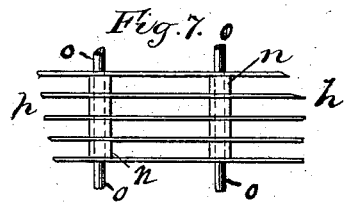
Fig. 7.
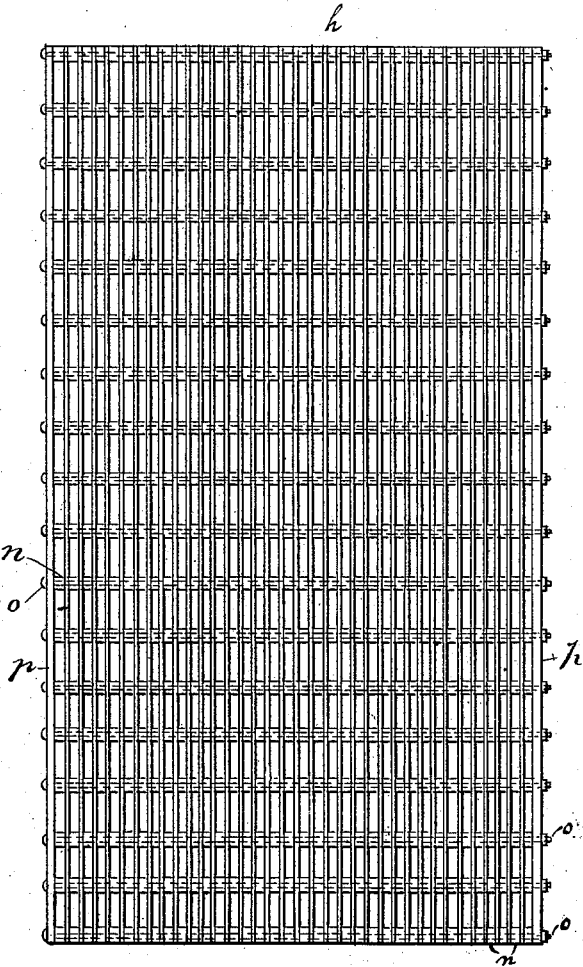
Fig. 1.
Fig. A. New.
Fig. B. Old.
Witnesses  Inventor:
John S. Thompson
by Chas. M. Higgins
Atty (No Model.) 2 Sheets—Sheet 2.

J. S. THOMPSON.
COFFEE SEPARATOR AND ASSORTER.

No. 297,729. Patented Apr. 29, 1884.

Witnesses:
Jno. E. Gavin
Henry F. Parker

Inventor:
John S. Thompson
by
C. M. Higgins
Atty

UNITED STATES PATENT OFFICE.

JOHN S. THOMPSON, OF BROOKLYN, NEW YORK.

COFFEE SEPARATOR AND ASSORTER.

SPECIFICATION forming part of Letters Patent No. 297,729, dated April 29, 1884.

Application filed July 28, 1883. (No model.)

*To all whom it may concern:*

Be it known that I, JOHN S. THOMPSON, of Brooklyn, Kings county, New York, have invented certain new and useful Improvements in Coffee Separators and Assorters, of which the following is a specification.

The object of my invention is to provide a means whereby coffee-berries may be separated into round and flat kinds in a simple, rapid, and efficient manner. Coffee received in the original bags or packages from the plantation or foreign ports contains both large and small and round and flat berries mixed with vegetable dust and other impurities; and before putting the coffee on the market it is usual to sift the berries, to separate them into the different kinds and sizes, and also to remove the dust and other impurities and "polish" or clean the berries, whereby they are brought into a much better condition for roasting and grinding, and command a higher price. Some of the special kinds and sizes also command a much higher price than the others, and particularly is this the case with the round or "pea" berries, which sell at a much higher price than the flat berries. The round berries are generally the "first fruit" of new trees, which is considered superior to subsequent crops from the same trees, which usually consist altogether of flat berries. The so-called pea-berries are not, however, so round as a pea, being generally oval longitudinally, same as the flat berries, but round in cross-section, with the usual longitudinal crease running along one side of the berry, whereas the flat berries are semi-round in cross-section, flat on one side, with the longitudinal crease running along the middle of the flat side. Round berries, therefore, of a certain length are larger in diameter than flat berries of the same length, and it would therefore seem evident that round and flat berries of the same length might be separated by means of sieves having meshes of a width adapted to allow the flat berries to pass through, but too small for the diameter of the round berries, which would thus be left separate upon the top of the sieve and delivered therefrom, while the flat beans would be delivered below the sieve. I find, however, that it is a mistake to rely on the width of the mesh alone as a means to determine the separation of the two berries, for regard must be had to the depth also of the mesh in relation with the size of the berries; otherwise a mesh of certain width but of little depth will allow flat and round berries of the same length to pass indifferently, as will be hereinafter shown.

Now, in coffee and other seed separating machines, it is common to use sieves formed from thin sheet-zinc or other sheet metal, in which the desired mesh or openings are formed by perforations punched therein, these perforations being both in the form of round openings and rectangular oblong slots. These sieves have been arranged in an inclined position—one above the other—in a shaking frame, and the coffee passes from one to the other in succession, the berries too large to pass through the mesh of one sieve being discharged from the top of the same, while the berries passing through the mesh of this sieve fall onto the next, where the second size of berries roll off the the top of the sieve, while all below the second size pass through the second sieve, and so on to the end of the series. Heretofore, however, such machines have been capable of separating the berries only into different sizes, and not into round and flat kinds, for the sieves have been constructed of thin sheet metal, in which the mesh has no appreciable depth in relation to its width, or in relation to the diameter of the berries to be separated, which is an important and essential element for separating flat from round berries, as before referred to. For example, by referring to Figure B in the drawings, it will be noted that we have represented a section of sieve formed of thin sheet metal with flat and round berries in the meshes thereof. Now, while it is clear that while the maximum diameter of the round berries is much larger than the maximum diameter of the flat berries, and also larger than the mesh of the sieve, yet by reason of the central crease in the round berry the diameter at this point is greatly reduced, and by reason of the thinness of the sieve the round berry can thus rotate on its crease in the mesh and drop through along with the flat berries, the separation of the two kinds being thus impossible with sieves of the ordinary construction. According to my invention, therefore, I construct the sieves with mesh of prolonged depth, such as shown in Fig. A of the drawings, the depth being about equal to the width of the mesh, or about equal to the width of the berry which it is necessary to exclude, so that the round berry is thus prevented effectually from rotating on its crease at the edge of the mesh, and is thus delivered from the top of the sieve, while the flat berries freely drop through the meshes, thereby separating the two kinds of berries in a simple and efficient manner; and my invention lies chiefly in a sieve thus constructed, as will be readily appreciated.

Figure 3:
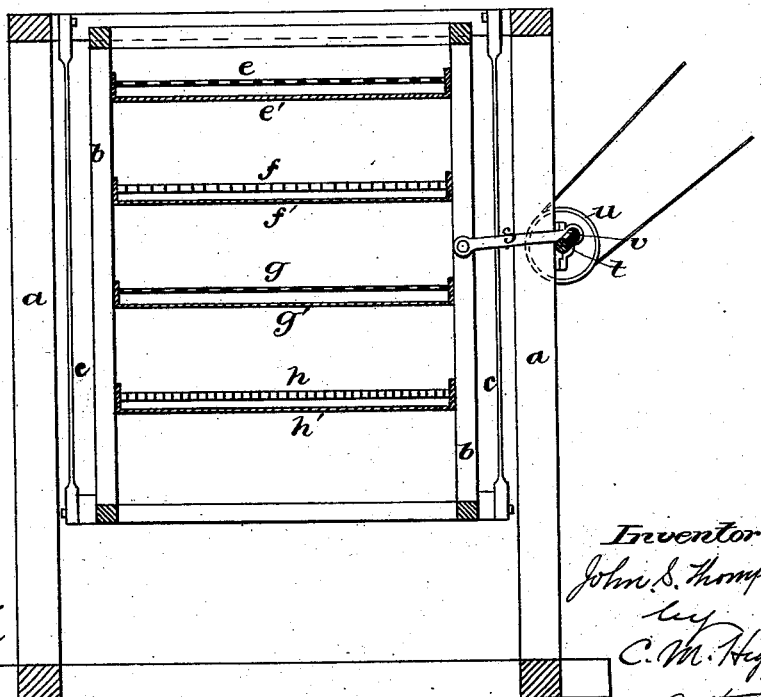

Fig. 1 in the drawings, represents a plan view of one of my improved sieves. Fig. 2 is a longitudinal section of a sifting or assorting machine of about the usual construction, before referred to, but equipped with some of my improved sieves arranged in alternate order with ordinary sieves. Fig. 3 is a cross-section of said machine. Figs. 4, 5, 6, and 7 represent fragments or sections of the successive series of sieves of the machine, showing the character of the respective meshes. Figs. A and B illustrate the action of the old and new series, as before described.

Referring first to Figs. 2 and 3, $a\ a$ indicate a strong fixed frame-work of wood or other material, within which is suspended a movable or swinging frame, $b\ b$, usually termed the "shoe," which sustains the sieves. This vibrating frame $b$ is suspended at each of its four corners by flexible wooden straps $c\ c$ from the four corners of the fixed frame $a$, so that it is capable of being swung or vibrated from side to side within the fixed frame. In the vibrating frame is mounted a series of sieves, $e\ f\ g\ h$, with corresponding underlying collecting chutes or bottoms, $e'\ f'\ g'\ h'$. These sieves and bottoms are inclined alternately in opposite directions, in zigzag order, as shown, and at the end of each sieve is an inclined delivery-trough, $i\ j\ k\ l$. While the bottom $e'$ of one sieve discharges onto the top of the next sieve, as shown, the last bottom, $h'$, discharges into a final trough, $m$, as seen in Fig. 2, which is the usual arrangement. Now, the first sieve, $e$, is one of the ordinary kind, formed of sheet metal perforated with large round holes, as shown best in Fig. 4, which in the original drawings are of full working size. The second sieve, $f$, is one of my novel kind, and has meshes of oblong slots, as seen in Fig. 5, and of prolonged depth, as before described, and shown in Fig. 2 and in Fig. A. The third sieve, $g$, is one of the ordinary kind, similar to the first, but with smaller holes, as seen in Fig. 6, while the last sieve $h$, as shown in Fig. 7, is of the novel kind, similar to the second, but with narrower slots. The novel sieves $f$ and $h$ are preferably formed, as shown best in Figs. 1 and A, by thin strips of sheet metal set up edgewise separated by washers $n$, and joined together by slender bolts $o\ o$, which are secured at the headed and nutted ends in the side frame-bars, $p\ p$, of wood or metal, thus forming meshes of oblong slot form with a prolonged depth about equal to their width, as before described.

Referring to Figs. 1 and 2, a rotary shaft, $t$, is mounted in bearings on the fixed frame $a$, and is provided with a driving-pulley, $u$, on its extremity, and with cranks $v\ v$ near the bearings, which are connected by pitmen $s\ s$ with the vibrating frame $b$, so that when power is applied to revolve the shaft the frame will be vibrated from side to side, and a sidewise shaking movement thus imparted to the sieves in the usual manner, to facilitate and insure the movement of the coffee over and through the same, as will be understood. On the end of the fixed frame $a$, over the summit of the first sieve, $e$, is fixed a hopper, $w$, into which the coffee to be assorted is fed.

The general construction of the machine and its sieves being now explained, the operation is as follows: The machine being set in motion and the coffee being fed into the hopper $w$, the berries of all sizes and kinds roll or slide down over the round-holed sieve $e$, and all berries too large to pass through its holes, which usually consist of flat berries altogether, are delivered into the trough $i$ at the end of the same, while the smaller berries pass endwise through the large holes of the sieve and fall onto the first bottom, $e'$, which conveys them to the first deep-slot sieve, $f$, whose slots or meshes are of suitable size to allow all the flat berries to drop through, which also necessitates the smaller round berries doing likewise, while all the larger round berries pass over the top of the sieve into the trough $j$ at the end thereof. The flat berries and the small round berries which have passed through the meshes of the slot-sieve $f$ are conveyed by the bottom $f'$ to the second round-holed sieve, $g$, whose mesh is of smaller size than the first, as seen in Fig. 6, and over this the larger flat berries pass into the trough $k$, while all the smaller round and flat berries pass endwise through the round holes and fall onto the bottom $g'$, which delivers them onto the second slot-sieve, $h$, which has narrower slots than the first, as seen in Fig. 7, and through which the remaining flat berries drop, while the round berries pass over the top of the sieve into the trough $l$, the flat berries passing through this sieve being conveyed by the bottom $h'$ to the final trough $m$; hence large flat berries are discharged at the first trough, $i$, large round berries at the second trough, $j$, smaller flat berries at the third trough, $k$, and smaller round berries at the fourth trough, $l$, and the remainder, usually all small flat berries, at the fifth trough, $m$. Any two of the aforesaid five sizes may be discharged from the troughs into a single receiver. It is usual to discharge the two sizes of round berries into the same receiver, and the two smaller sizes of flat berries into a second receiver, while a third receptacle receives the larger flats from the first trough, $i$.

It will be noted that the number of sieves and the number of separators described are generally necessary, in order to thoroughly separate the round and flat berries, for if a separation of the largest flat berries were not made on the top screen some of them would pass off the top of the second screen with the large round berries into the trough, and if the third screen were not used to remove the larger of the remaining flat berries before being led to the last screen many flat berries would be discharged with the round berries in the trough *l*. It will therefore be readily appreciated that, with the peculiar construction and arrangement of screens set forth, coffee may be rapidly and perfectly separated into flat and round berries of different sizes, and an important improvement thus accomplished in the assortment of coffee.

The improved deep-meshed sieves described, instead of being made of strips of sheet metal set edgewise, as shown in Fig. 1, may of course be made from sheet metal with the slots punched therein, provided the metal is of such increased thickness as will provide a mesh or slot of prolonged depth, having a definite relation with the thickness of the coffee-berry, so as to prevent the rotation of the said berry therein, as before described.

I do not confine myself to any particular machine or method of using the herein-described novel sieves, but have illustrated the ordinary form of sifting-machine as one simple mode of employing said sieves, without limiting myself to that.

What I claim as my invention is as follows:

1. A sieve for separating round from flat coffee-berries, provided with oblong meshes of a width and length to admit the flat berries, and sides of prolonged depth equal to their width, or sufficient to prevent the rotation of the round berries therein, whereby the flat berries drop through the meshes, while the round berries pass off the top of the sieve, substantially as herein set forth.

2. A sieve for separating round from flat coffee-berries, formed of narrow strips set up edgewise and fastened together in a supporting-frame at fixed intervals, and sufficiently apart to form oblong meshes between the strips, which meshes have a prolonged depth equal to their width, or nearly so, substantially as and for the purpose set forth.

3. A coffee-assorting machine for separating round from flat berries, formed with a series of successively-arranged screens of successively-diminishing mesh over which the coffee is passed successively, the said screens being formed alternately with mesh of shallow depth—such as *e g*—and mesh of prolonged depth—such as *f h*—whereby the coffee is separated into round and flat berries of different sizes, substantially as herein shown and described.

4. In a coffee sifting and separating machine, the successively-arranged series of screens *e f g h* of diminishing mesh, the screens *e g* having round-holed mesh of immaterial depth, and the screens *f h* slotted mesh of prolonged depth, arranged and operating substantially as and for the purpose set forth.

JNO. S. THOMPSON.

Witnesses:
JNO. E. GAVIN,
CHAS. M. HIGGINS.